(12) United States Patent
Chu et al.

(10) Patent No.: US 9,128,170 B2
(45) Date of Patent: Sep. 8, 2015

(54) LOCATING MOBILE DEVICES

(75) Inventors: David Chiyuan Chu, Bellevue, WA (US); Lin Zhong, Houston, TX (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/537,082

(22) Filed: Jun. 29, 2012

(65) Prior Publication Data

US 2014/0005930 A1    Jan. 2, 2014

(51) Int. Cl.
*G01S 5/02* (2010.01)
*G01C 21/30* (2006.01)
*G01S 19/40* (2010.01)

(52) U.S. Cl.
CPC .............. *G01S 5/0252* (2013.01); *G01C 21/30* (2013.01); *G01S 19/40* (2013.01)

(58) Field of Classification Search
CPC .......... G01S 13/931; G01S 2013/9353; G01S 2013/9357; G01S 2013/936; G01S 2013/9382; G01S 19/41; G01S 19/42; G01S 19/50; G01S 19/17; G01S 19/48; G01S 19/49
USPC ......... 701/539, 533, 445, 443, 441, 438, 434, 701/425, 431, 426, 422, 419, 418, 417, 412, 701/450, 453, 457, 482, 444, 454, 472, 516, 701/408, 409, 411, 410, 416, 488
See application file for complete search history.

(56) References Cited

U.S. PATENT DOCUMENTS 5,982,324 A * 11/1999 Watters et al. ........... 342/357.29
6,462,708 B1 * 10/2002 Tsujimoto et al. ....... 342/357.43
6,707,421 B1 *  3/2004 Drury et al. .............. 342/357.31
7,466,244 B2   12/2008 Kimchi et al.
2005/0075116 A1 *  4/2005 Laird et al. ................. 455/456.3
2007/0233367 A1   10/2007 Chen et al.
2009/0027418 A1    1/2009 Maru et al.
2010/0234071 A1 *  9/2010 Shabtay et al. ............ 455/562.1

FOREIGN PATENT DOCUMENTS

GB         2412281 A  *  9/2005

OTHER PUBLICATIONS

Design of a Rich multimodal Interface for Mobile Spoken Route Guidance; Markku Turunen, Jakko Hakulinen, Anssi Kainulainen, Aleksi Melto, Topi Hurtig; Department of Computer Sciences, University of Tampere, Finland; p. 2193-2196; ftp://ftp.cs.pitt.edu/web/projects/nlp/conf/interspeech2007/IS2007/PDF/AUTHOR/IS070869.PDF.*

Way back machine, TOMTOM, Map share, http://web.archive.org/web/20101206155103/http://www.tomtom.com/page/mapshare.*
Way back machine, TOMTOM, points of interest http://web.archive.org/web/20101206201508/http://www.tomtom.com/services/service.php?id=5.*

(Continued)

*Primary Examiner* — James Trammell
*Assistant Examiner* — James E Stroud
(74) *Attorney, Agent, or Firm* — Dan Choi; Doug Barker; Micky Minhas

(57) ABSTRACT

The claimed subject matter provides a method for displaying a map comprising a location estimate on a mobile device. The method includes displaying an interface specifying a correction to the location estimate. The method also includes determining a revised location based on the correction. Additionally, the method includes displaying the map comprising the correction.

17 Claims, 11 Drawing Sheets

(56) References Cited

OTHER PUBLICATIONS

TOMTOM's crowdsourcing: 5 millionth map correction, ludovic Privat, http://www.gpsbusinessnews.com/TomTom-s-crowdsourcing-5-millionth-map-correction__a1234.html.*

Kumar, et al., "FOLKSOMAPS—Towards Community Driven Intelligent Maps for Developing Regions", Retrieved at <<http://ieeexplore.ieee.org/xpl/freeabs_all.jsp?arnumber=5426701>>, International Conference on Information and Communication Technologies and Development (ICTD), Apr. 17-19, 2009, pp. 85-94.

"Map Marker Help", Retrieved at <<http://support.google.com/mapmaker/bin/static.py?hl=en&topic=1094951&guide=1094359&page=guide.cs&answer=1096110>>, Retrieved Date: Dec. 30, 2011, pp. 05.

Haklay, et al., "OpenStreetMap: User-Generated Street Maps", Retrieved at <<http://ieeexplore.ieee.org/stamp/stamp.jsp?tp=&arnumber=4653466>>, IEEE Pervasive Computing, vol. 7, No. 4, Oct.-Dec. 2008, pp. 12-18.

Abdelmoty, et al., "Building Place Ontologies for the Semantic Web: Issues and Approaches", Retrieved at <<http://tripod.shef.ac.uk/publications/abdelmoty-smart-jones%202007.pdf>>, Proceedings of the 4th ACM workshop on Geographical information retrieval, Nov. 9, 2007, pp. 7-12.

* cited by examiner

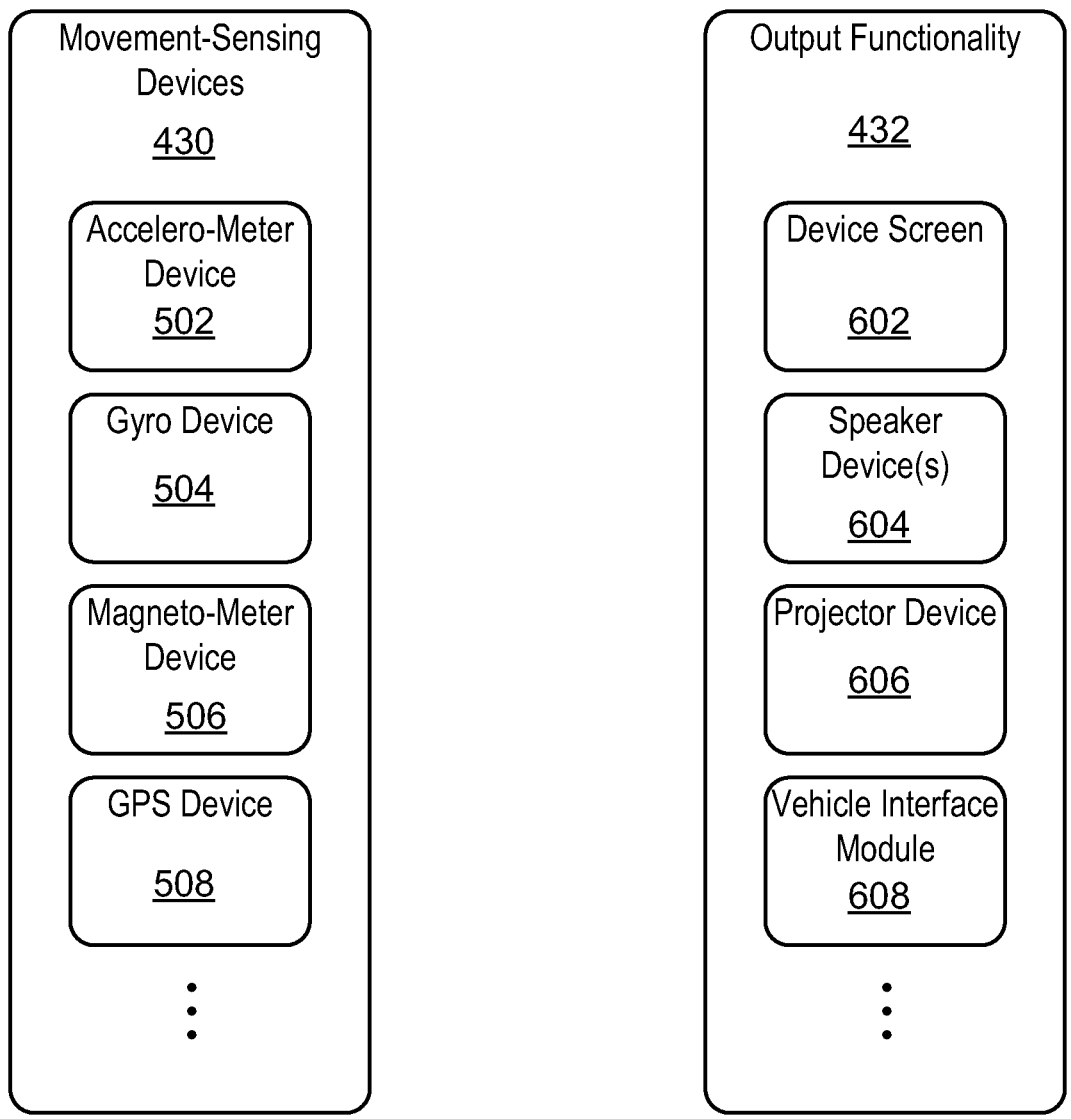

1100

1200

LOCATING MOBILE DEVICES

BACKGROUND

Despite advancements in localization technologies, mobile users are still finding problems with their map and nagivation services. For example, in a downtown area where high rises create an "urban canyon," location derived from a global positioning system (GPS) can be off by more than a block. The many different buildings in urban areas have different properties due to varied building materials.

For example, the process by which satellites calculate GPS data is adversely affected by the different reflectants in building materials. These varied materials, along with increased building density in cities, has created urban canyons where GPS users receive inaccurate information about their location.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

A mobile device is described herein that provides a user interface experience to a user who is operating the mobile device while traveling. The mobile device performs this task using localization service improvement functionality. The mobile device is docked in a mount in a vehicle. When guided to an incorrect location by a localization service, the mobile device provides an interface for correcting the location estimate. The corrections may be aggregated from a crowd-source of corrections to the original location estimate. The mobile device also provides an interface for adding transitory landmarks to maps from a map service. The mobile device automatically determines the available times of seasonal landmarks, based on the time of reports to the mobile device for adding the transitory landmark.

BRIEF DESCRIPTION OF THE DRAWINGS

FIG. 5 shows example movement-sensing devices in accordance with the claimed subject matter;

FIG. 6 shows example output functionality in accordance with the claimed subject matter;

DETAILED DESCRIPTION

Figure 1:
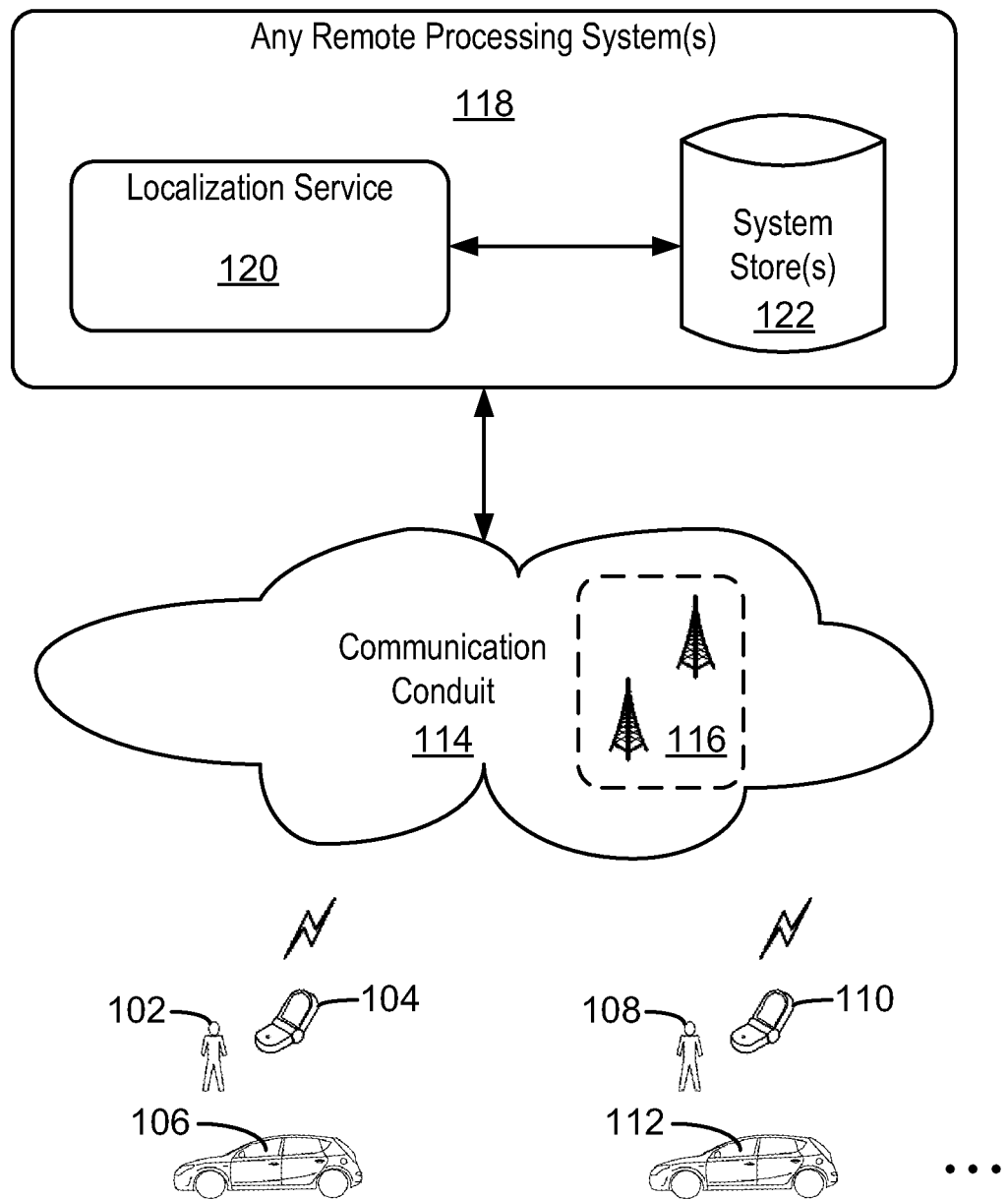
FIG. 1 shows an example environment in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media can include but are not limited to magnetic storage devices (e.g., hard disk, floppy disk, and magnetic strips, among others), optical disks (e.g., compact disk (CD), digital versatile disk (DVD), and others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Another localization technology with challenges is the map service. Map services are cloud services, typically, with databases where the map data may be limited to include permanent and major landmarks. Further, map services do not update their databases periodically enough to reflect real-time changes in the world. As such, these databases typically contain outdated entries, making it challenging to find seasonal or temporary landmarks. These limits also may lead to navigation errors for map service users. An example embodiment improves location reporting for GPS devices (or mobile devices with GPS), and the relevance of map data from map services. In such an embodiment, a feedback mechanism compensates for outdated databases, and improves the accuracy of GPS location reporting in urban canyons.

Section A describes illustrative functionality for providing an interactive experience using a mobile device for GPS location reporting. Section B describes illustrative methods that explain the operation of the interactive experience functionality. Section C describes illustrative computing functionality that can be used to implement various aspects of the interactive experience described in Sections A and B.

A. Illustrative Mobile Device and Environment of Use

The following discussion describes use of a mobile device while travelling by vehicle. However, it is noted that embodiments of the recited subject matter may be implemented for travelling by vehicle, or by foot.

FIG. 1 shows an example environment 100 for mobile devices operating within vehicles. For example, FIG. 1 depicts an illustrative user 102 who operates a mobile device 104 within a vehicle 106, and a user 108 who operates a mobile device 110 within a vehicle 112. However, the environment 100 can accommodate any number of users, mobile devices, and vehicles. To simplify the explanation, this section will set forth the illustrative composition and manner of operation of the mobile device 104, operated by the user 102, treating this mobile device 104, as representative of any mobile device's operation within the environment 100. Moreover, in certain cases, this explanation will state that the mobile device 104, performs certain processing functions. This statement is to be construed broadly. In some cases, the mobile device 104, can perform a function by providing logic which executes this function. Alternatively, or in addition, the mobile device 104, can perform a function by interacting with a remote entity, which performs the function on behalf of the mobile device 104.

In an example of the recited subject matter, the mobile device 104 is a general purpose computing device that operates in at least two modes. In a handheld mode of operation, the user 102 can interact with the mobile device 104 while holding it in his or her hands. For example, the user 102 can interact with a touch input device of the mobile device 104 and/or a keypad of the mobile device 104 to perform any device function. Similarly, in a vehicle mode of operation, the user 102 can interact with the mobile device 104 in his or her vehicle 106. For example, the mobile device 104 may provide interfaces, and selection options relevant to the act of driving, e.g., the interactive experience for improving localization services. Additionally, during vehicle mode, the mobile device 104 may assesses the state of the vehicle 106 (i.e., the "vehicle state" according to the terminology used herein) based on inference-input information. In the vehicle state, the mobile device 104 provides an interactive experience for improving localization services as set forth below in greater detail.

By way of overview, the vehicle state characterizes the manner in which the vehicle 106 is currently being operated by the user 102. Some aspects of the vehicle state may directly pertain to the dynamics of the vehicle's movement. Such direct aspects can include, but are not limited to: the speed at which the vehicle 106 is traveling; the manner in which the vehicle 106 is being accelerated and decelerated; the manner in which the vehicle 106 is being steered; the manner in which the breaks of the vehicle 106 are being applied, and so on.

Other aspects of the vehicle state may have a more indirect bearing on the manner in which the vehicle 106 is moving. For example, these aspects of the vehicle state may pertain to the qualifying circumstances in which vehicle 106 movement is taking place. Such indirect aspects can include, but are not limited to: the region in which the vehicle 106 is traveling; the time of day in which the vehicle 106 is traveling; the date at which the vehicle 106 is traveling; the weather through which the vehicle 106 is traveling; the road condition over which the vehicle 106 is traveling, and so forth.

The mobile device 104 can determine the vehicle state based on inference-input information. The inference-input information pertains to any information that can be used to infer the vehicle state. Some of the inference-input information may originate from input sources which are internal to the mobile device 104. Other inference-input information may originate from input sources which are external to the mobile device 104.

Generally, a user interface experience refers to the manner in which a user 102 interacts with the mobile device 104, either by providing user-input information to the mobile device 104 or receiving output information from the mobile device 104. More specifically, the manner in which the user 102 provides user-input information to the mobile device 104 is defined by various input modes that a user 102 can use to provide the user-input information to the mobile device 104. Illustrative input modes can include a keypad input mode, a touch screen input mode, a voice-recognition input mode, a gesture-recognition input mode, vision, video recording modes, and so on (to be described in greater detail below). The manner in which the mobile device 104 provides output information to the user is defined by various output modes. Illustrative output modes can include a display output mode, a speech output mode, and so on (to be described in greater detail below). The mobile device 104 can vary the user interface experience by activating and/or deactivating certain input modes and/or output modes. Alternatively, or in addition, the mobile device 104 can vary the user interface experience by changing the manner of operation of any input mode and/or any output mode (again, to be described in greater detail below).

By way of overview, the system 100 improves the accuracy of a localization service. The system 100 improves the accuracy by attempting to determine the user's true location in the event of a location reporting error. In one embodiment, clues provided by the mobile device 104 improve the accuracy of location reporting. This functionality helps combat the urban canyon problem of GPS localization. When a user realizes her map shows inaccurate location, the mobile device 104 may be used to provide landmark references that improve the location reporting to be accurate up to the same side of the street. Accuracy can be improved within meters using landmark location references, depending upon how the landmarks restrict the possible area. In one embodiment, the mobile device 104 may automatically detect inaccuracies, e.g., when not enough satellites are available to estimate the location.

Further, as more and more feedback is provided to report inaccuracies from the same area, the collective local location estimations and their corrected locations may be correlated. Thus, when a new user 102 enters a geographical region that has correlated feedback, the location reporting may be revised automatically. In one embodiment, the location reporting may be improved using crowd-sourcing techniques. Additionally, the mobile device 104 may enable users to add landmarks, including seasonal landmarks, to maps presented on the mobile device 104. In one embodiment, the landmark data may be stored in the system store 122.

Given the above overview, the description will now advance to a more detailed description of the individual features depicted in FIG. 1. Starting with the mobile device 104 itself, this apparatus can be implemented in any manner and can perform any function or combination of functions. For example, the mobile device 104 can correspond to a mobile telephone or dedicated device with GPS device functionality. This includes smartphones, GPS devices, laptops, tablets, netbooks, game devices, portable media systems, interface modules, and so on.

The vehicle 106 can correspond to any mechanism for transporting the user 102. For example, the vehicle 106 may correspond to an automobile of any type, a truck, a bus, a motorcycle, a scooter, a bicycle, an airplane, a boat, and so on. However, to facilitate explanation, an example vehicle 106 corresponds to a personal automobile operated by the user 102.

The environment 100 also includes a communication conduit 114 for allowing the mobile device 104 to interact with any remote entity (where a "remote entity" means an entity that is remote with respect to the user 102). For example, the communication conduit 114 may allow the user 102 to use the mobile device 104 to interact with another user who is using another mobile device (such as the user 108 who is using the mobile device 110). In addition, the communication conduit 114 may allow the user 102 to interact with any remote services. Generally speaking, the communication conduit 114 can represent a local area network, a wide area network (e.g., the Internet), or any combination thereof. The communication conduit 114 can be governed by any protocol or combination of protocols.

More specifically, the communication conduit 114 can include wireless communication infrastructure 116 as part thereof. The wireless communication infrastructure 116 represents the functionality that enables the mobile device 104 to communicate with remote entities via wireless communication. The wireless communication infrastructure 116 can encompass any of cell towers, base stations, central switching stations, satellite functionality, and so on. The communication conduit 114 can also include hardwired links, routers, gateway functionality, name servers, etc.

The environment 100 also includes one or more remote processing systems 118. The remote processing systems 118 provides services to the users. In one case, each of the remote processing systems 118 can be implemented using one or more servers and associated data stores. For instance, FIG. 1 shows that the remote processing systems 118 can include at least one instance of a localization service 120 and an associated system store 122. The localization service 120 may be a GPS or map service. The associated system store 122 may include basic data accessible from the mobile device 104 that can be leveraged in a vehicle context, and other scenarios. The data may include information about the vehicle state, and the location of the vehicles 106. The vehicle state information may include the number of passengers, OBDII data such as oil and fuel levels, temperature, and more. The ensuing description will set forth illustrative functions that the system 100 can perform that are germane to the operation of the mobile devices 104 within the vehicles 106.

Figure 2:
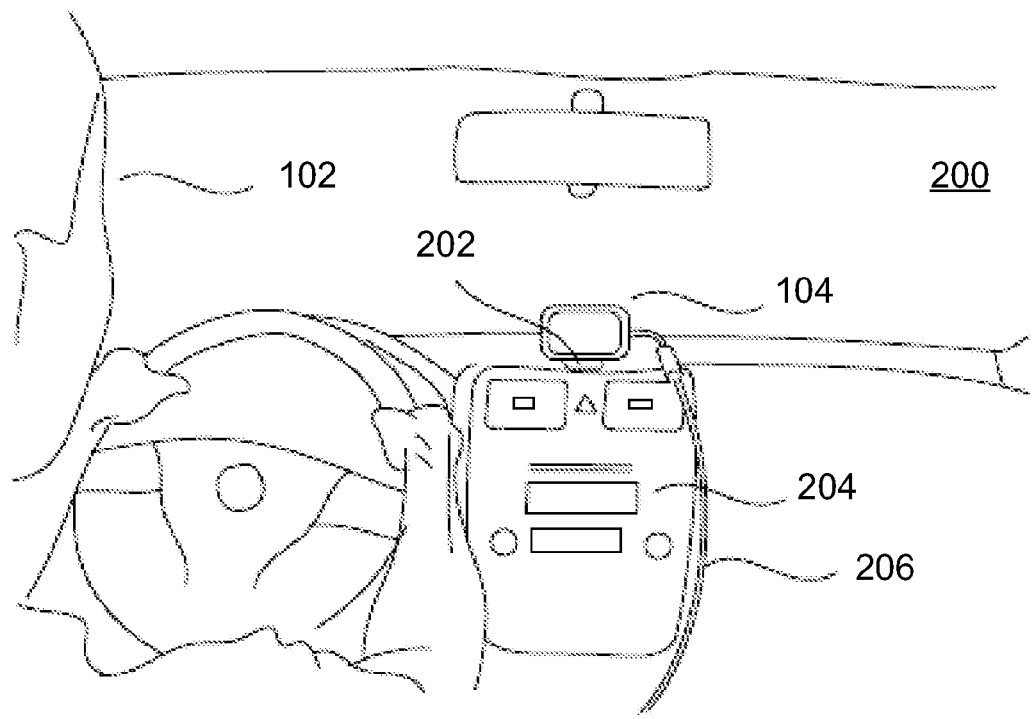
FIG. 2 depicts an interior region of a vehicle in accordance with the claimed subject matter.

FIG. 2 shows a portion of a representative interior region 200 of a vehicle 106. A mount 202 secures the mobile device 104 within the interior region 200. More specifically, the mount 202 secures the mobile device 104 to the top of the vehicle's dashboard, to the right of the user 102, just above the vehicle control panel region 204. A power cord 206 supplies power from any power source provided by the vehicle 106 to the mobile device 104 (either directly or indirectly, as will be described with respect to FIG. 7.

The mobile device 104 can include at least one internal camera device (not shown in FIG. 2) having a field of view that projects out from a face of the mobile device 104, towards the user 102. More specifically, the user 102 can place the mobile device 104 within the interior region 200 in such a manner that the field of view of the camera device encompasses at least a part of the anatomy of the user 102. In one implementation, this placement enables the internal camera device to establish an interaction space. The internal camera device can capture gestures made by the user 102 within that interaction space. In one illustrative implementation, the interaction space may generally correspond to a conic volume that extends approximately 60 cm from the face of the mobile device 104, pointed towards the user 102 who is driving the vehicle 106 (although different end-use environments can adopt interaction spaces having different "sizes" and shapes).

However, the placement of the mobile device 104 shown in FIG. 2 is merely representative, meaning that the user 102 can choose other locations and orientations of the mobile device 104. For example, the user 102 can place the mobile device 104 in a left region with respect to the steering wheel, instead of a right region with respect to the steering wheel (as shown in FIG. 2). This might be appropriate, for example, in countries in which the steering wheel is provided on the right side of the vehicle 106. Alternatively, the user 102 can place the mobile device 104 directly behind the steering wheel or on the steering wheel. Alternatively, the user 102 can secure the mobile device 104 to the windshield of the vehicle 106. These possible placements are mentioned by way of illustration, not limitation. Still other placements of the mobile device 104 are possible.

Figure 3:
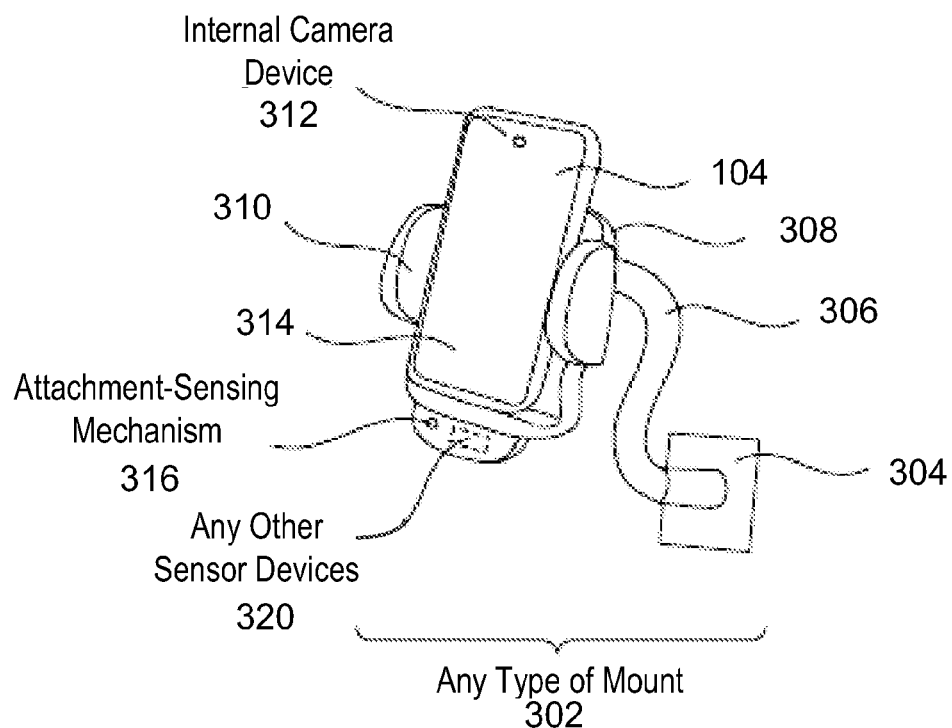
FIG. 3 shows an example mount within a vehicle.

FIG. 3 shows a mount 302 that can be used to secure the mobile device 104 to some surface of the interior region 200. Note that this mount 302 is a different type of mount than the mount 202 shown in FIG. 2. Without limitation, the mount 302 of FIG. 3 includes any type of coupling mechanism 304 for fastening the mount 302 to a surface within the interior region 200. For instance, the coupling mechanism 304 can include a clamp or protruding member (not shown) that attaches to an air movement grill of the vehicle 106. In other cases, the coupling mechanism 304 can include a plate or other type of member which can be fastened to any surface of the vehicle 106 using any type of fastener (e.g., screws, clamps, a Velcro coupling mechanism, a sliding coupling mechanism, a snapping coupling mechanism, a suction cup coupling mechanism, etc.).

In still other cases, the mount 302 can merely sit on a generally horizontal surface of the interior region 200, such as on the top of the dashboard, without being fastened to that surface. To reduce the risk of this type of mount sliding on the surface during movement of the vehicle 106, it can include a weighted member, such as a sand-filled malleable base member.

In one merely illustrative implementation, the representative mount 302 shown in FIG. 3 includes a flexible arm 306 which extends from the coupling mechanism 304 and terminates in a cradle 308. The cradle 308 can include an adjustable clamp mechanism 310 for securing the mobile device 104 to the cradle 308. In this particular scenario, the user 102 has attached the mobile device 104 to the cradle 308 so that it can be operated in a portrait mode. But the user 102 can alternatively attach the mobile device 104 so that it can be operated in a landscape mode (as shown in FIG. 2).

As mentioned above, the mobile device 104 includes at least one internal camera device 312 which projects out from a front face 314 of the mobile device 104 (or other face of the mobile device 104). The internal camera device 312 is identified as "internal" insofar as it is typically considered an integral part of the mobile device 104. In addition, the mobile device 104 can receive image information from one or more external camera devices (not shown).

Further, the mount 302 may incorporate any attachment-sensing mechanism 316 for determining when the mobile device 104 has been inserted in the cradle 308 of the mount 302. For example, the attachment-sensing mechanism 316 can comprise a mechanical switch that is toggled from an OFF to an ON state when the user 102 inserts the mobile device 104 into the cradle 308, and from an ON to OFF state when the mobile device 104 becomes dislodged from the cradle 308. Other implementations of the attachment-sensing device include a light-sensing switch, a pressure-sensing switch, and so on. Alternatively, or in addition, the mobile device 104 can implement an attachment sensing mechanism (not shown). That is, in complementary fashion, a device-implemented attachment sensing mechanism is configured to be activated when the user 102 places the mobile device 104 in the cradle 308. Alternatively, or in addition, the mobile device 104 can infer the fact that it has become dislodged from the cradle 308 based on indirect evidence.

Further, the mount 302 can include one or more supplemental sensor devices 320 (depicted generically in FIG. 3 by a dashed box). For example, the sensor devices 320 can encompass one or more of the types of movement-sensing devices 430 shown in FIG. 5 (to be described below). In addition, the mount 302 can encompass additional image-sensing mechanisms, such one or more additional camera devices of any type, etc.

Figure 4:
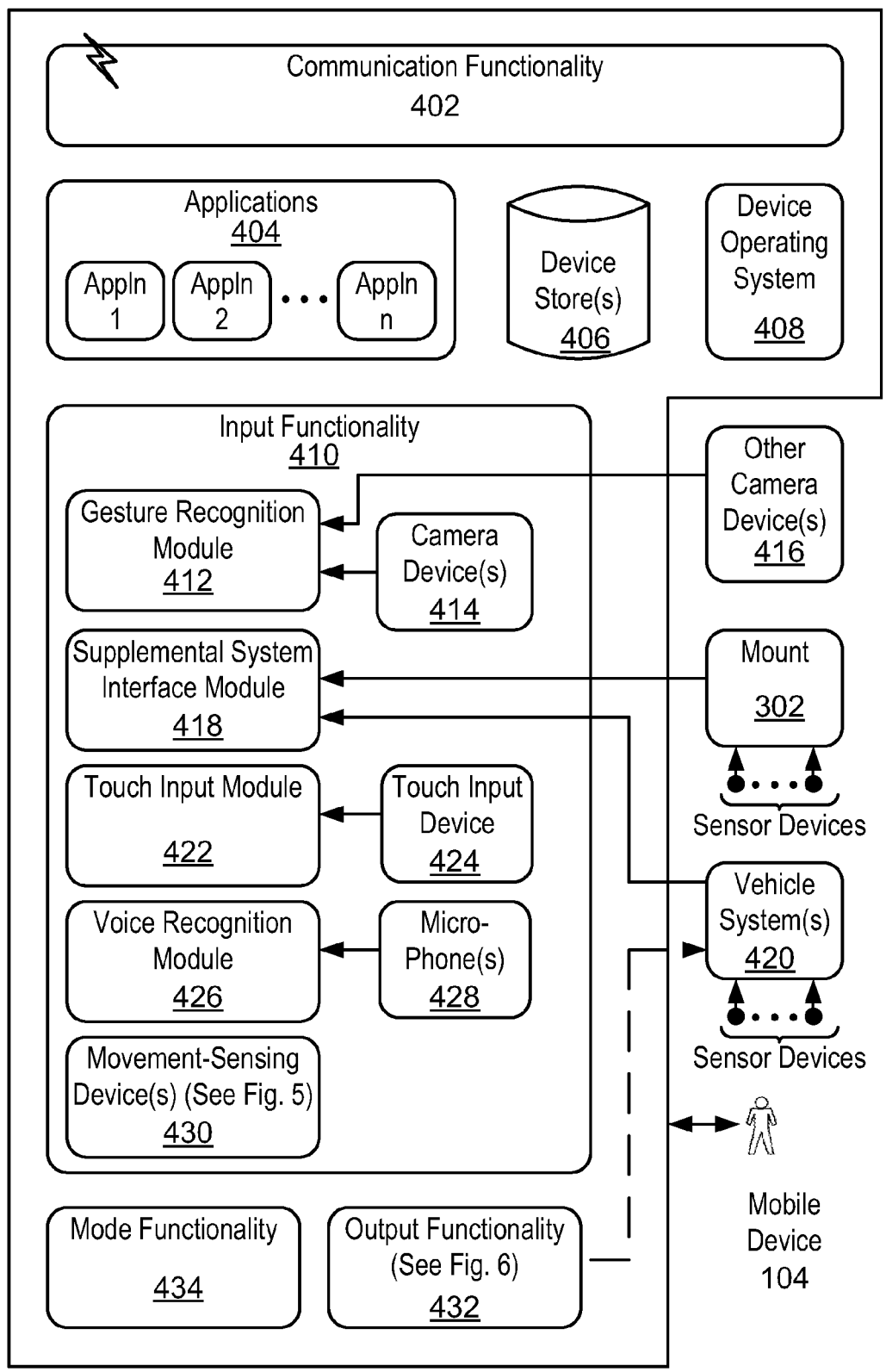
FIG. 4 shows an example mobile device in accordance with the claimed subject matter.

FIG. 4 shows various components that can be used to implement the mobile device 104. This figure is generally described from top-to-bottom as represented. The mobile device 104 includes communication functionality 402 for receiving and transmitting information to remote entities via wireless communication. That is, the communication functionality 402 may comprise a transceiver that allows the mobile device 104 to interact with the wireless communication infrastructure 116 of the communication conduit 114.

The mobile device 104 can also include a set of one or more applications 404. The applications 404 represent any type of functionality for performing any respective tasks. In some cases, the applications 404 perform high-level tasks. To cite representative examples, a first application may perform a localization improvement task, a second application can perform a media presentation task, a third application can perform a communication task, and so on. In other cases, the applications 404 perform lower-level management or support tasks. The applications 404 can be implemented in any manner, such as by executable code, script content, etc., or any combination thereof. In other implementations, at least parts of the applications 404 can be implemented by the remote processing systems 118. For example, in certain implementations, some of the applications 404 may represent network-accessible documents or functionality. The mobile device 104 can also include at least one device store 406 for storing any application-related information, as well as other information.

For example, the applications 404 for localization improvement include an interface and an aggregator (not shown). The interface enables a users to provide inputs relevant to location correction, and adding landmarks to maps. The interface is described in greater detail below with respect to FIGS. 10-13. The aggregator interacts with a map service and derives a refined location based on the interface inputs. In one embodiment, the aggregator autocorrects location estimations, and derives the location and schedule of transitory landmarks. The aggregator's output is reflected on a map displayed on the mobile device 104. In one embodiment, the aggregator runs in the cloud.

The mobile device 104 can also include a device operating system 408. The device operating system 408 provides functionality for performing low-level device management tasks. Any application can rely on the device operating system 408 to utilize various resources provided by the mobile device 104. The mobile device 104 can also include input functionality 410 for receiving and processing input information. Generally, the input functionality 410 includes some functionality for receiving input information from internal input devices (which represent components that are part of the mobile device 104 itself), and some functionality for receiving input information from external input devices. The input functionality 410 can receive input information from external input devices using any coupling technique or combination of coupling techniques, such as hardwired connections, wireless connections (e.g., Bluetooth® connections), and so on.

The input information that is used to infer the state of the vehicle 106 is referenced to herein as inference-input information. This input information that is provided by the user 102 is referenced to herein as user-input information. These two classes of input information are not mutually exclusive. Some of the information that is input by a user 102 may constitute inference-input information. A generic reference to "input information," without the qualifier "user" or "inference," refers to any type of input information.

The input functionality 410 may include a gesture recognition module 412 for receiving image information from at least one internal camera device 414, and/or from at least one external camera device 416. For example, the external camera device 416 can be associated with the mount 302, or by some other unit within the vehicle 106. Any of these camera devices can provide any type of image information. For example, in one case, a camera device can provide video image information, produced by receiving visible-spectrum radiation, infrared-spectrum radiation, etc., or combination thereof. In another case, a camera device can provide image information that can be further processed to provide depth information. Depth information provides an indication of the distances between different points in a captured scene and a reference point, e.g., corresponding to the location of the camera device. Depth processing functionality can generate depth information using any technique, such as a time-of-flight technique, a structured light technique, a stereoscopic technique, and so on. After receiving the image information, the gesture recognition module 412 can determine whether the image information reveals that the user 102 has made a recognizable gesture.

The input functionality 410 can also receive image information from one or more camera devices that capture a scene that is external to the vehicle 106. For example, an internal or external camera device can capture a scene in front of the vehicle 106, in back of the vehicle 106, to either side, etc. These camera devices can also be used in conjunction with any type depth processing functionality described above. The use of depth processing functionality allows the mobile device 104 to assess the distance between the vehicle 106 and other nearby vehicles and obstacles. The input functionality 410 can also receive inference-input information from any other type of distance sensing mechanism, such as a Light Detection And Ranging (LIDAR) sensing device, etc.

The input functionality 410 can also include a supplemental system interface module 418. The supplemental system interface module 418 receives inference-input information from any vehicle system 420, and/or from the mount 302, and/or from any other external system. For example, the supplemental system interface module 418 can receive any type of on-board information provided by the vehicle's information management system. Such information can describe the operating state of the vehicle 106 at a particular point in time, such as by providing information regarding the vehicle's speed, steering state, breaking state, engine temperature, engine performance, odometer reading, oil level, fuel level, the presence of passengers in the vehicle 106, and so on. To provide this information, the vehicle system 420 can receive sensor information from a plurality of sensing devices provided by the vehicle 106. Alternatively, or in addition, the supplemental system interface module 318 can receive inference-input information collected by one or more sensor devices, such as, one or more supplemental accelerometer devices provided by the mount 302.

The input functionality 410 may also include a touch input module 422 for receiving user-input information when a user 102 touches a touch input device 424. Although not depicted in FIG. 4, the input functionality 410 can also include any type of physical keypad input mechanism, any type of joystick control mechanism, any type of mouse device mechanism, and so on. The input functionality 410 can also include a voice recognition module 426 for receiving voice commands from one or more microphone devices 428.

The input functionality 410 can also include one or more movement-sensing devices 430. Generally, the movement-sensing devices 430 determine the manner in which the mobile device 104 is being moved at any given time. That information, in turn, can pertain to either the dynamic movement of the mobile device 104 and/or its position at any given time. Advancing momentarily to FIG. 5, this figure indicates that the movement-sensing devices 430 can include any of an accelerometer device 502, a gyro device 504, a magnetometer device 506, a GPS device 508 (or other satellite-based position-determining mechanism), a dead-reckoning position-determining device (not shown), a cell tower or WiFi triangulation device (not shown), and so on. Further, the movement-sensing device 430 can include any type of vision device described above, e.g., corresponding to one or more camera devices and associated functionality. That is, the images captured by the vision device comprise evidence regarding the movement of the vehicle 106, 112; therefore, the vision device can be considered as a type of movement-sensing device. This set of possible devices is representative, rather than exhaustive. In other cases, another entity besides, or in addition to, the mobile device 104 can assess the movement of the mobile device 104, such as any functionality provided by the remote processing systems 118.

Referring back to FIG. 4, the mobile device 104 also includes output functionality 432 for conveying information to a user 102 in an output presentation. Advancing momentarily to FIG. 6, this figure indicates that the output functionality 432 can include any of a device screen 602, one or more speaker devices 604, a projector device 606 for projecting output information onto any surface, and so on.

The output functionality 432 also includes a vehicle interface module 608 that enables the mobile device 104 to send output information to any vehicle system 420 associated with the vehicle 106. This allows the user 102 to interact with the mobile device 104 to control the operation of any functionality associated with the vehicle 106 itself. For example, the user 102 can interact with the mobile device 104 to control the playback of media content on a separate vehicle media system. The user 102 may prefer to directly interact with the mobile device 104 rather than the systems of the vehicle 106 because the user 102 is presumably already familiar with the manner in which the mobile device 104 operates. Moreover, the mobile device 104 has access to a remote system store 122 which can provide user-specific information. The mobile device 104 can leverage this information to control any vehicle system 420 in a manner that is customized for a particular user 102.

Referring back to FIG. 4, the mobile device 104 may also include mode functionality 434. The mode functionality 434 performs the functions summarized above, which include assessing the state of the vehicle 106 at a particular point in time and providing an interactive experience that takes into consideration the vehicle state. At least parts of the mode functionality 434 can be implemented by the remote processing systems 118.

Figure 7:
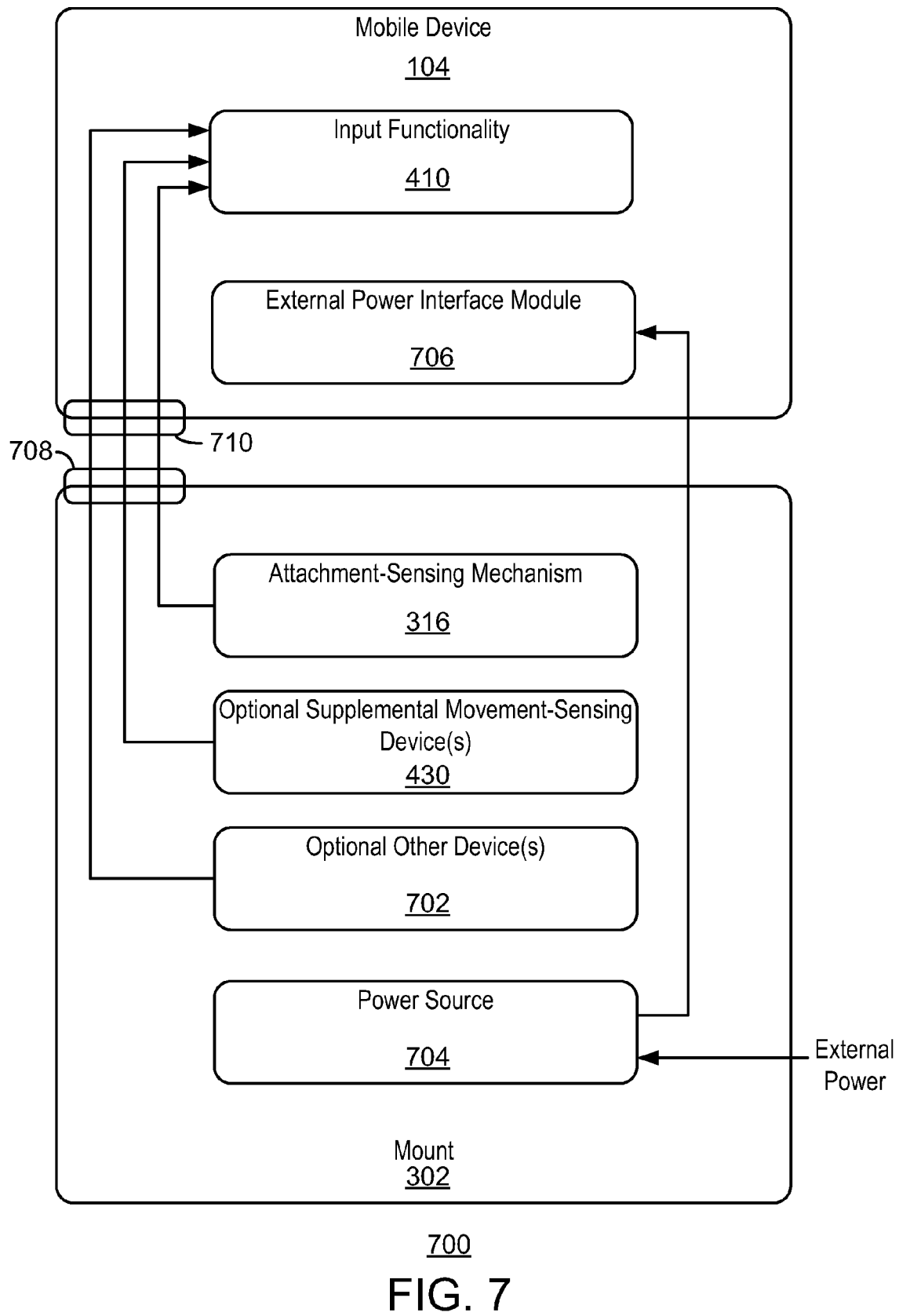
FIG. 7 shows example functionality associated with the mount in accordance with the claimed subject matter.

FIG. 7 illustrates one manner in which the functionality provided by the mount 302 can interact with the mobile device 104. The mount 302 can include interface 708, connected to interface 710 of the mobile device 104. The interfaces 708, 710 allow the input functionality 410 of the mobile device 104 to communicate with the components of the mount 302.

The mount also includes an attachment sensing mechanism 316, which provides an attachment signal to the input functionality 410 of the mobile device 104. The attachment signal indicates whether or not the mobile device 104 is presently coupled to the mount 302. The mount 302 can also include any of the type of the movement-sensing devices 430 shown in FIG. 5 for providing inference-input information to the input functionality 410 of the mobile device 104. The mount 302 can also include other devices 702 for providing inference-input information to the input functionality 410 of the mobile device 104. Alternatively, or in addition, the devices 702 can perform various processing functions, and can then send the results of such processing to the mobile device 104.

The mount 302 can also include a power source 704 which feeds power to the mobile device 104, e.g., via an external power interface module 706 provided by the mobile device 104. The power source 704 may, in turn, receive power from any external source, such as a power source (not shown) associated with the vehicle 106. In this implementation, the power source 704 powers both the components of the mount 302 and the mobile device 104. Alternatively, each of the mobile device 104, and the mount 302 can be supplied with separate sources of power.

Figure 8:
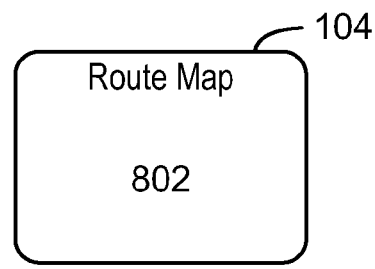
FIG. 8 shows an example output mode in accordance with the claimed subject matter.
Figure 9:
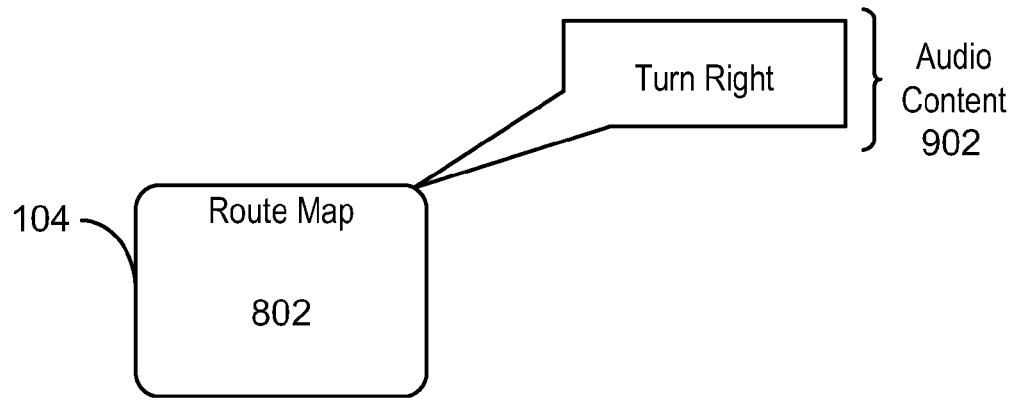
FIG. 9 shows an example output mode in accordance with the claimed subject matter.

FIGS. 8 and 9 pictorially summarize two output modes. That is, in FIG. 8, the mobile device 104 presents visual content on the display screen 602 of the mobile device 104. For example, during a trip using the localization service 120, a map route 802 may be displayed. In FIG. 9 the mobile device 104, presents audio content that supplements or replaces the visual content 802. For example, the message 902 may be announced over the speaker device 604.

Figure 10:
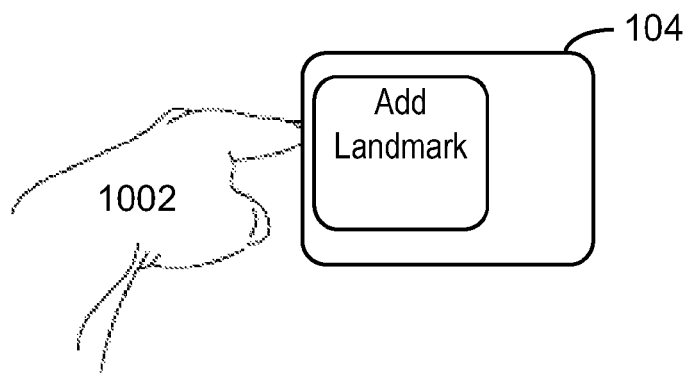
FIGS. 10-12 show three example input modes in accordance with the claimed subject matter.
Figure 11:
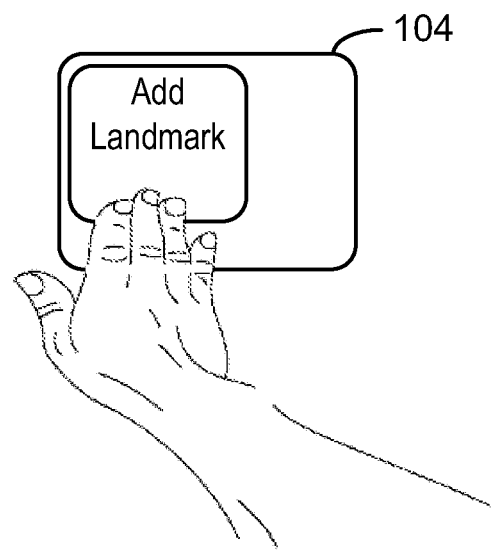
Figure 12:
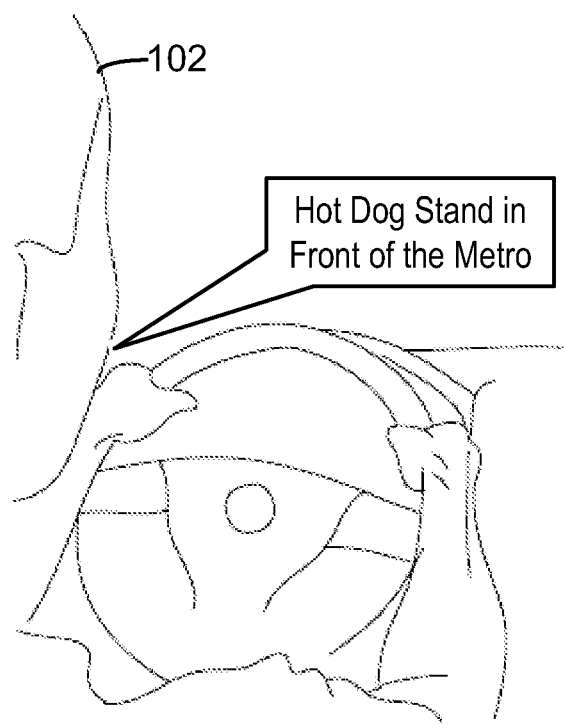

FIGS. 10-12 pictorially summarize three input modes. That is, in FIG. 10, the touch input module 422 accepts user-input information when the user 102 uses a hand 1002 to touch an icon 1004 or other object presented on a touch input screen of the mobile device 104. For example, the icon 1004 may initiate a process to add a landmark to the map. In FIG. 11, the gesture recognition module 412 receives user-input information when the user 102 makes a gesture that is captured by the internal camera device 414 of the mobile device 104, without touching the mobile device 104. The gesture recognition module 412 can recognize this gesture by comparing the captured image information with candidate gesture information associated with each of a set of possible candidate gestures. In this example, the leader may add a landmark to the map with an appropriate gesture. For example, a hot dog stand may not be displayed on the map provided by a map service because the hot dog stand is only open during the summer. In FIG. 12, the voice recognition module 426 receives user-input information when the user 102 annunciates a voice command. In this example, the user 102 describes the relative location of the new landmark to be added. As shown, another landmark, "The Metro," is used to describe the relative location of the new, transitory landmark.

Figure 13:
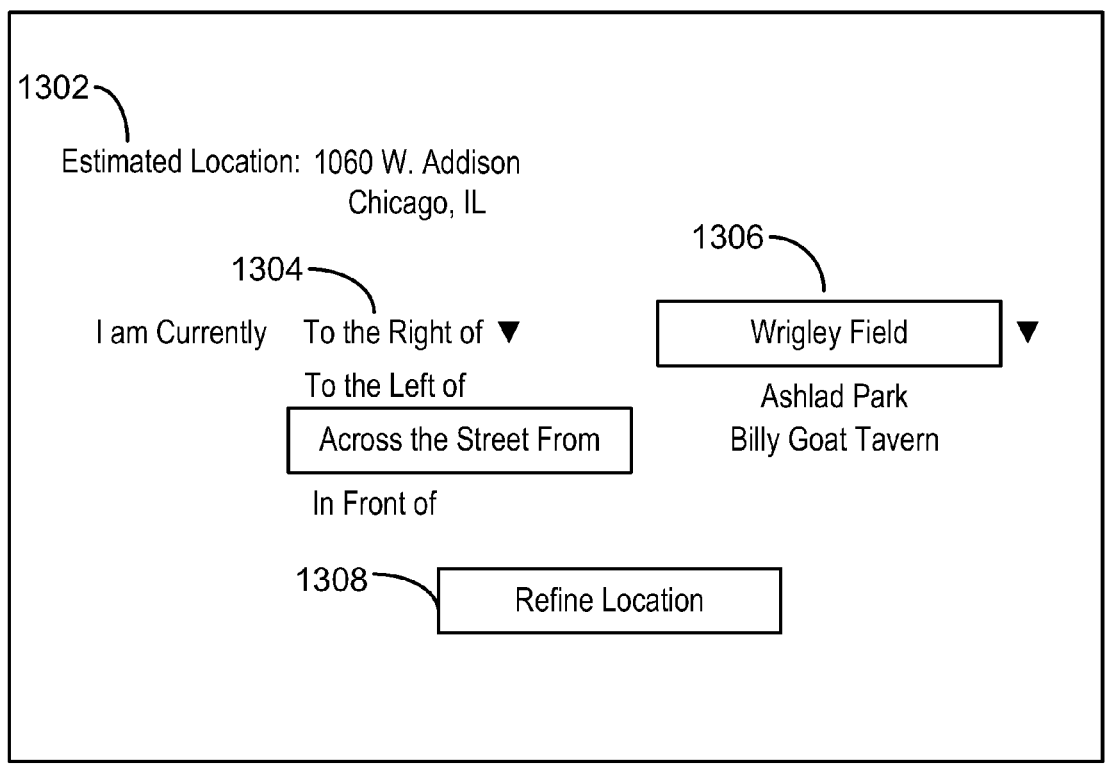
FIG. 13 shows an example interface for localization service improvement in accordance with the claimed subject matter.

FIG. 13 shows an example interface 1300 for localization service improvement in accordance with the claimed subject matter. The interface 1300 enables the user 102 to describe the location of a major landmark relative to the user's 102 current position. The interface 1300 includes an estimated location 1302, relative location selections 1304, landmark selections 1306, and an icon 1308. The interface 1300 leverages the location estimation and a map service to provide the list of landmark selections 1306. The interface 1300 provides choices for the user 102 to refer to the relative location of the landmark to her current position, e.g. "in front of," "to the right of" and "the opposite side of the street of" etc. The description will be analyzed to produce the name of the landmark and its relative location. The analysis will call upon both automated and mechanical turks to refine the position. The aggregation application searches the area adjacent to the estimated location using a map service, and refines the location estimation using the interface inputs as a constraint. As more, better interface inputs are added, the aggregator application narrows down the location to the block and to the street side. When the user 102 requests the original location estimate, the automated constraints run on the back end to narrow down the location estimate based on revised estimates provided through crowd-sourcing. In one embodiment, the user 102 may identify landmarks to use for the relative location. Additionally, landmarks could be sensor-based landmarks, such as landmark with a certain acoustic signature, visual signature, radio spectrum signature, or other sensor-based property consistent with its location. Such landmarks do not have to be entered by the user. Rather, they are automatically sensed by the mobile device 104.

Figure 14A:
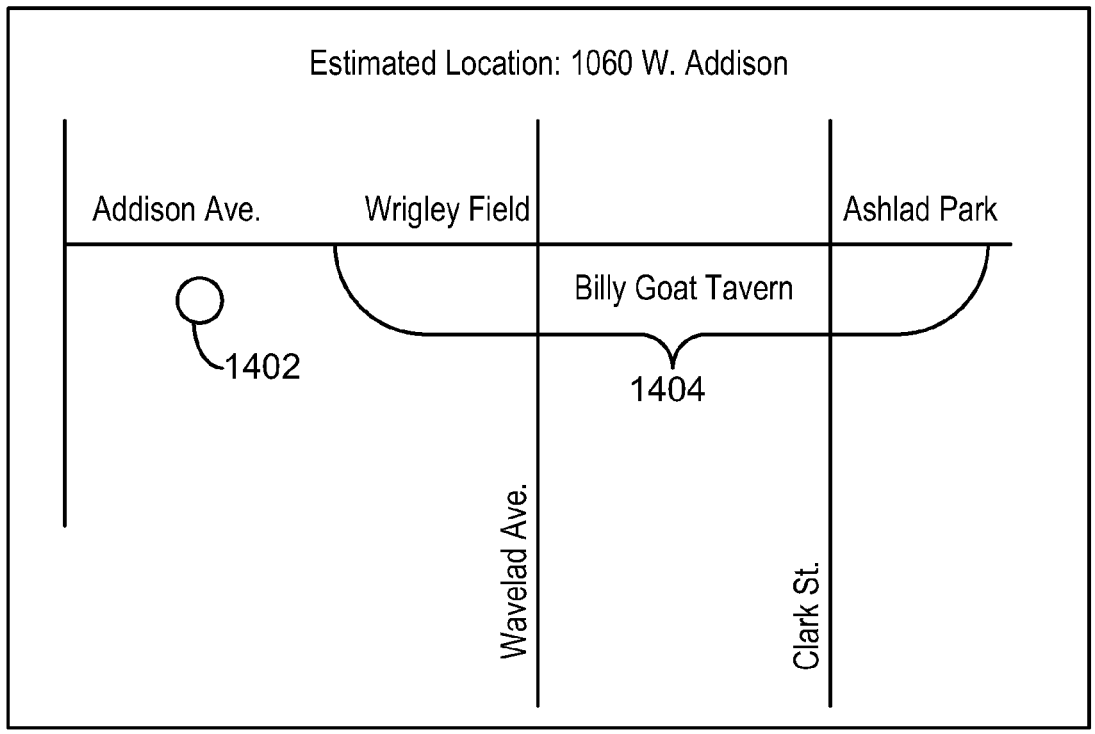
FIG. 14A shows an example interface for localization service improvement in accordance with the claimed subject matter.

FIG. 14A shows an example interface 1400A for localization service improvement in accordance with the claimed subject matter. The interface 1400A shows the original estimated location 1402, and local landmarks 1404 derived by the aggregator application in concert with the map service.

Figure 14B:
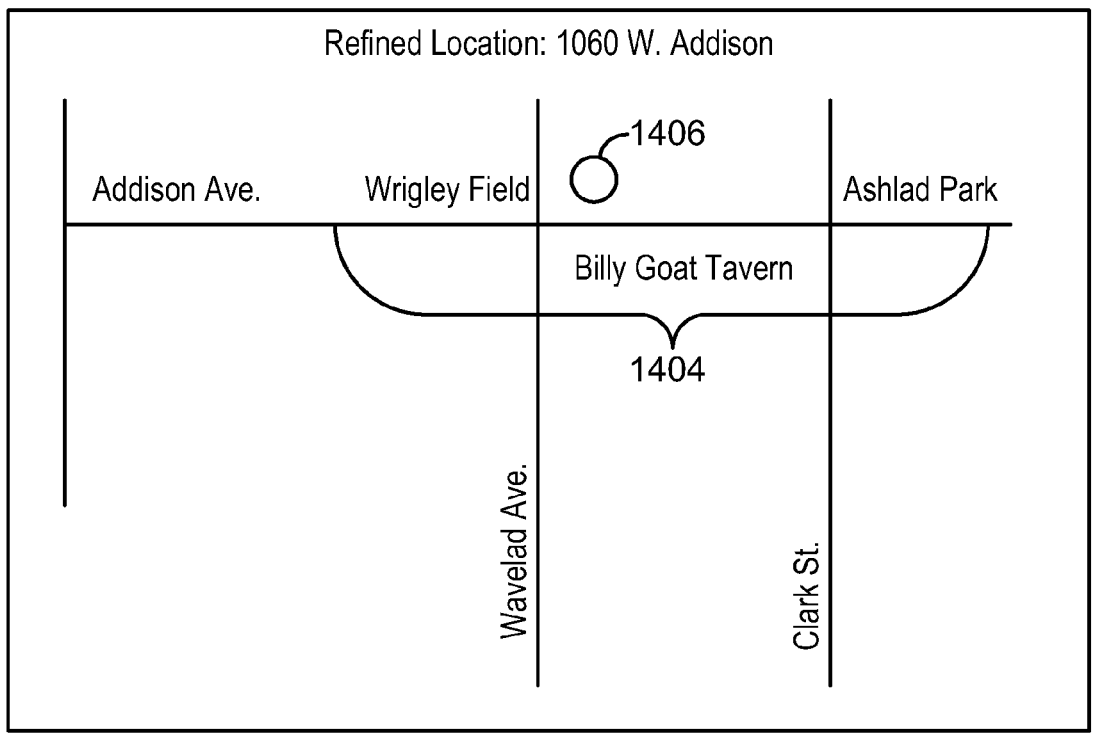
FIG. 14B shows an example interface for localization service improvement in accordance with the claimed subject matter.

FIG. 14B shows an example interface 1400B for localization service improvement in accordance with the claimed subject matter. The interface 1400B shows the revised location 1406. The aggregator application may store the interface inputs, the corrected location, and the original location estimation, potentially including the raw information used by the mobile device 104 to estimate the location 1402, e.g., the raw satellite signal strength. By correlating the original location estimation 1302 and the final corrected location 1306, the aggregator application may construct a mapping function. The mapping function gives the corrected location 1406 in future location estimates. The corrected location, instead of the original location estimation 1402, can be displayed from the beginning, potentially saving the user effort and time to provide input to correct the original estimation 1402.

Similar to the interface 1300, the interface for adding landmarks involves describe location in relative terms to another landmark. Additionally for adding landmarks, the aggregator application derives the location and time of operation of the landmark from the interface input. Further, aggregate derivations from multiple users are used to improve the location accuracy of added landmarks.

B. Illustrative Processes

Figure 15:
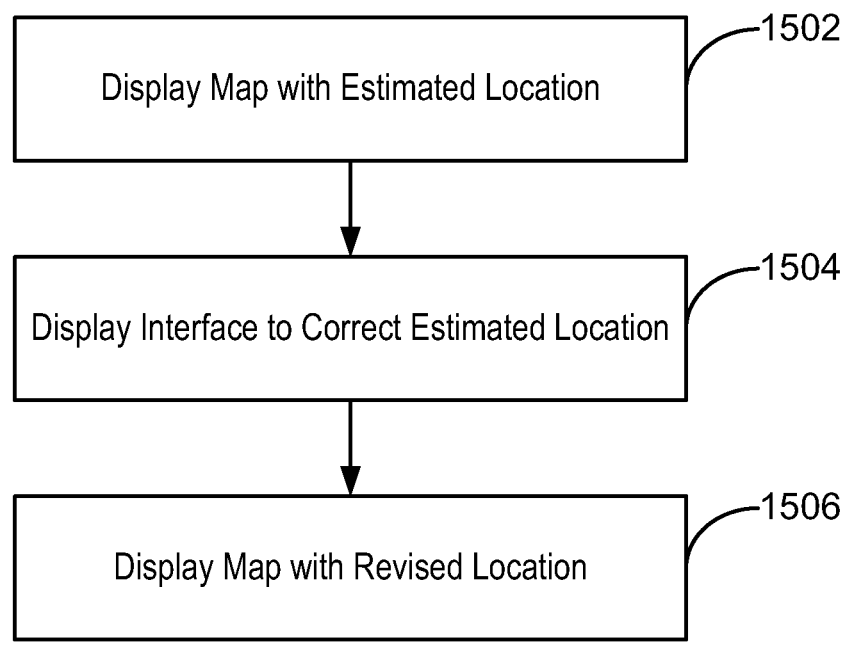
FIG. 15 shows a process flow chart for a method in accordance with the claimed subject matter.

FIG. 15 shows a process flow chart for a method in accordance with the claimed subject matter. The method begins at block 1502, where the mobile device 104 displays a map with an estimated location. At block 1504, the mobile device 104 displays an interface for correcting the location estimate. At block 1506, the mobile device 104 displays the map with the revised location estimate.

C. Representative Computing functionality

Figure 16:
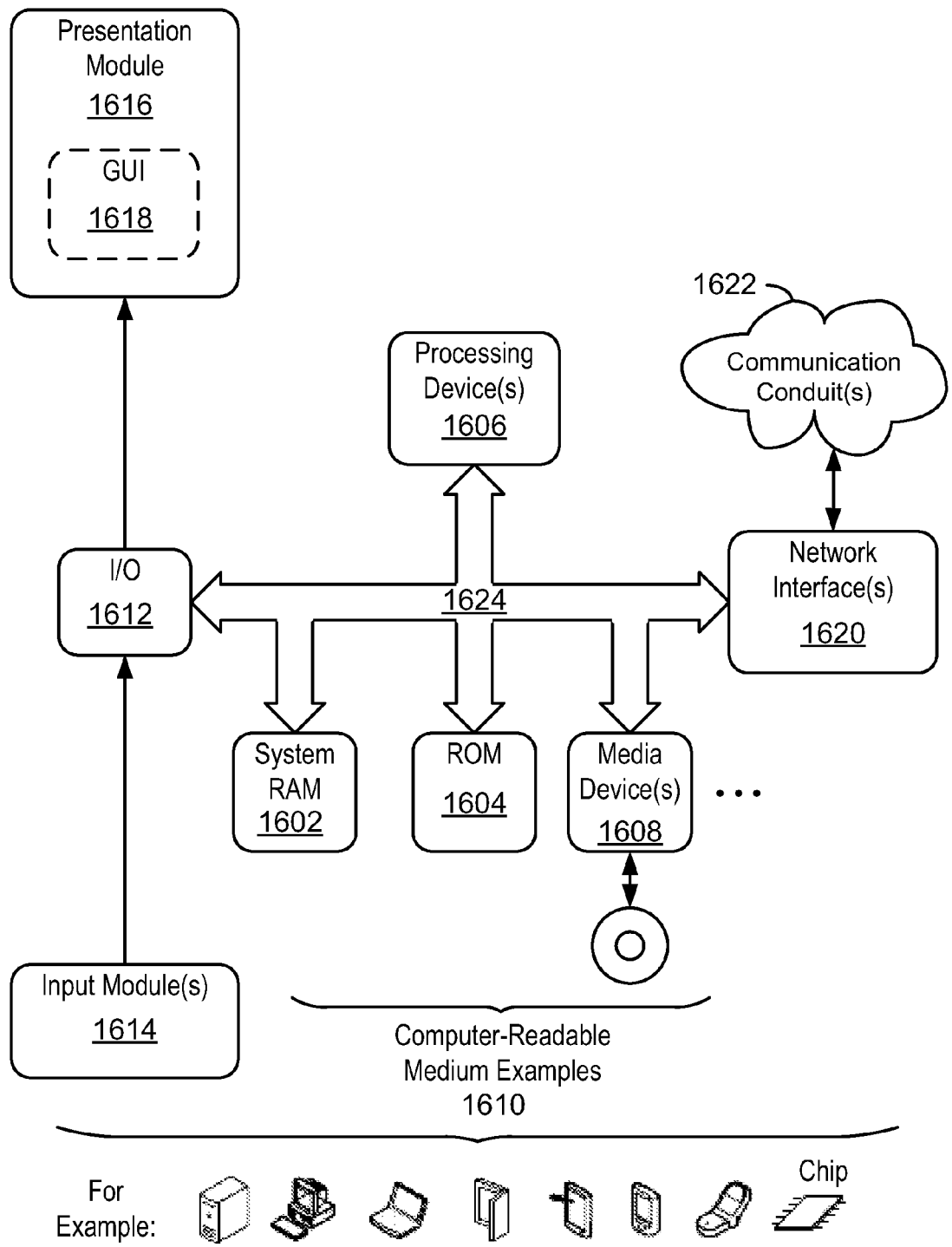
FIG. 16 shows example computing functionality that can be used to implement any aspect of the features shown in the foregoing drawings.

FIG. 16 sets forth illustrative computing functionality 1600 that can be used to implement any aspect of the functions described above. For example, the computing functionality 1600 can be used to implement any aspect of the mobile device 104. In addition, the type of computing functionality 1600 shown in FIG. 16 can be used to implement any aspect of the remote processing systems 118. In one case, the computing functionality 1600 may correspond to any type of computing device that includes one or more processing devices. In all cases, the computing functionality 1600 represents one or more physical and tangible processing mechanisms.

The computing functionality 1600 can include volatile and non-volatile memory, such as RAM 1602 and ROM 1604, as well as one or more processing devices 1606 (e.g., one or more CPUs, and/or one or more GPUs, etc.). The computing functionality 1600 also may include various media devices 1608, such as a hard disk module, an optical disk module, and so forth. The computing functionality 1600 can perform various operations identified above when the processing device(s) 1606 executes instructions that are maintained by memory (e.g., RAM 1602, ROM 1604, or elsewhere).

More generally, instructions and other information can be stored on any computer readable medium 1610, including, but not limited to, static memory storage devices, magnetic storage devices, optical storage devices, and so on. The term computer readable medium also encompasses plural storage devices. In all cases, the computer readable medium 1610 represents some form of physical and tangible entity.

The computing functionality 1600 also includes an input/output module 1612 for receiving various inputs (via input modules 1614), and for providing various outputs (via output modules). One particular output mechanism may include a presentation module 1616 and an associated graphical user interface (GUI) 1618. The computing functionality 1600 can also include one or more network interfaces 1620 for exchanging data with other devices via one or more communication conduits 1622. One or more communication buses 1624 communicatively couple the above-described components together.

The communication conduit(s) 1622 can be implemented in any manner, e.g., by a local area network, a wide area network (e.g., the Internet), etc., or any combination thereof. The communication conduit(s) 1622 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Additionally, the functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data, such as, data-sanitizing mechanisms, encryption mechanisms, password-protection mechanisms, and so on.

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for improving a localization service, comprising:
    displaying a map comprising a location estimate on a mobile device to a user of the mobile device, wherein the location estimate contains an error due to structures blocking wireless signals of the location service from being received at the mobile device;
    displaying a graphical user interface at the mobile device enabling a correction to be specified by the user to the location estimate based on landmarks displayed in the interface;
    receiving a correction indication at the graphical user interface based on a selection from the user of the landmarks displayed;
    determining a revised location based on the correction indication received at the graphical user interface based on the user selection from among the landmarks displayed; and
    displaying a revised map comprising the revised location.

2. The method recited in claim 1, wherein the structures comprise an urban canyon, and wherein determining the revised location comprises mapping raw satellite data associated with the estimated location to the revised location based on the correction.

3. The method recited in claim 1, comprising determining the revised location based on a plurality of corrections provided by crowd-sourcing.

4. The method recited in claim 3, comprising aggregating the plurality of corrections to determine the revised location.

5. The method recited in claim 1, wherein the graphical user interface comprises:
    a list of the landmarks, the landmarks being disposed proximately to the revised location; and
    a list of relative locations describing a location of the mobile device relative to a selected landmark of the list of landmarks.

6. The method recited in claim 5, wherein the list of landmarks is generated by a map service in response to a request from the mobile device.

7. The method recited in claim 5, wherein the list of landmarks is generated by mechanical turks.

8. The method recited in claim 1, wherein the list of landmarks is automatically generated by sensor-detection, wherein the list comprises landmarks comprising a specific sensor-based property consistent with a location of the mobile device.

9. The method recited in claim 8, wherein the sensor-based property comprises a selected one of a specific acoustic signature, a specific visual signature, and a specific radio spectrum signature.

10. The method recited in claim 1, wherein the localization service comprises a global positioning system (GPS).

11. The method recited in claim 1, wherein the localization service comprises a map service.

12. The method recited in claim 9, comprising:
    displaying a graphical user interface for specifying a transitory landmark;
    determining a time span to associate with the transitory landmark; and
    displaying the transitory landmark on the mobile device in response to determining a current location of the mobile device is in proximity to the transitory landmark, and a current time is within the time span.

13. A system for improving a localization service, comprising:
    a processing unit; and
    a system memory, wherein the system memory comprises code configured to direct the processing unit to:
        provide a graphical user interface to a user of a mobile device, wherein the interface is rendered at the mobile device;
        enabling a correction to be specified by the user of the graphical user interface to a location estimate from the localization service, wherein the location estimate contains an error due to structures blocking wireless signals of the location service from being received at the mobile device;
        provide a list of landmarks to describe the correction to the location estimate from the localization service;
        receive the correction from the user at the graphical user interface based on a user selection from the landmark list;
        determine a revised location based on the correction, wherein the correction describes a current location of a mobile device in relation to a user-selected one of the list of landmarks received at the graphical user interface;
        map the revised location to the location estimate; and
        automatically determine the revised location in response to a request to the localization service associated with the original location estimate.

14. The system recited in claim 13, comprising code configured to direct the processing unit to determine the revised location based on crowd-sourcing that specifies a plurality of corrections to the location estimate, wherein determining the revised location comprises aggregating the plurality of corrections.

15. The system recited in claim 13, wherein the structures comprise an urban canyon, and wherein determining the revised location comprises mapping raw satellite data associated with the estimated location to the revised location based on the correction.

16. The system recited in claim 13, wherein the graphical user interface comprises:
    a list of the landmarks disposed proximately to the revised location, wherein the list of landmarks are generated by a map service in response to a request from the mobile device; and a list of relative locations describing a location of the mobile device relative to a selected landmark of the list of landmarks.

17. The system recited in claim 13, wherein the localization service comprises one of a global positioning system (GPS) and a map service.

* * * * *